US012658342B2

(12) United States Patent
Radovinsky et al.

(10) Patent No.: US 12,658,342 B2
(45) Date of Patent: Jun. 16, 2026

(54) PARTITIONED SUPERCONDUCTING CABLE

(71) Applicants: Massachusetts Institute of Technology, Cambridge, MA (US); Commonwealth Fusion Systems LLC, Cambridge, MA (US)

(72) Inventors: Alexey Radovinsky, Cambridge, MA (US); Charlie Sanabria, Shirley, MA (US); Christopher Craighill, Cambridge, MA (US); Krishna Kiran Kumar Uppalapati, North Billerica, MA (US); Alexander Creely, Boston, MA (US); Daniel Brunner, Cambridge, MA (US)

(73) Assignees: Massachusetts Institute of Technology, Cambridge, MA (US); Commonwealth Fusion Systems LLC, Devens, MA (US)

( * ) Notice: Subject to any disclaimer, the term of this patent is extended or adjusted under 35 U.S.C. 154(b) by 264 days.

(21) Appl. No.: 17/908,331

(22) PCT Filed: Mar. 4, 2021

(86) PCT No.: PCT/US2021/020916
§ 371 (c)(1),
(2) Date: Aug. 31, 2022

(87) PCT Pub. No.: WO2021/178697
PCT Pub. Date: Sep. 10, 2021

(65) Prior Publication Data
US 2023/0101820 A1 Mar. 30, 2023

Related U.S. Application Data

(60) Provisional application No. 62/985,546, filed on Mar. 5, 2020.

(51) Int. Cl.
*H01B 12/02* (2006.01)
*H01B 1/02* (2006.01)
(Continued)

(52) U.S. Cl.
CPC ............. *H01B 12/02* (2013.01); *H01B 1/026* (2013.01); *H01B 1/08* (2013.01); *H01B 12/14* (2013.01); *H01F 6/06* (2013.01)

(58) Field of Classification Search
CPC .......... H01B 12/02; H01B 1/026; H01B 1/08; H01B 12/14; H01B 12/10; H01B 12/06; H01B 3/306; H01F 6/06; Y02E 40/60
See application file for complete search history.

(56) References Cited

U.S. PATENT DOCUMENTS

| | | | | |
|---|---|---|---|---|
| 4,329,539 A * | 5/1982 | Tanaka | .................. | H10N 60/80 72/286 |
| 8,437,819 B2 | 5/2013 | Takayasu et al. | | |

(Continued)

FOREIGN PATENT DOCUMENTS

| | | | | |
|---|---|---|---|---|
| CA | 2734280 C * | 5/2014 | ............. | H01B 12/16 |
| CA | 3 170 080 | 9/2021 | | |

(Continued)

OTHER PUBLICATIONS

Uglietti, "A Review of Commercial High Temperature Superconducting Materials for Large Magnets: From Wires and Tapes to Cables and Conductors;" a Topical Review in Superconducting Science and Technology, vol. 32; Published Apr. 9, 2019; 29 Pages.

(Continued)

*Primary Examiner* — Mohamad A Musleh
(74) *Attorney, Agent, or Firm* — Daly, Crowley, Mofford & Durkee, LLP

(57) ABSTRACT

Described is a cable comprising a plurality of high temperature superconductor (HTS) components, a plurality of elec-
(Continued)

trically conductive segments extending along a length of the cable, each of the plurality of electrically conductive segments comprising one of the plurality of HTS components, and an electrically insulating material arranged between adjacent ones of the plurality of electrically conductive segments.

18 Claims, 11 Drawing Sheets

(51) Int. Cl.

| | |
|---|---|
| ***H01B 1/08*** | (2006.01) |
| ***H01B 12/14*** | (2006.01) |
| ***H01F 6/06*** | (2006.01) |

(56) References Cited

U.S. PATENT DOCUMENTS

| | | | | |
|---|---|---|---|---|
| 9,183,970 | B2 | 11/2015 | Maeda et al. | |
| 9,316,801 | B1 * | 4/2016 | Kithuka | H01B 11/10 |
| 9,734,940 | B1 * | 8/2017 | McNutt | H01B 11/06 |
| 9,941,032 | B2 | 4/2018 | Jin et al. | |
| 10,062,485 | B2 | 8/2018 | Iwasa et al. | |
| 10,079,092 | B2 | 9/2018 | Iwasa et al. | |
| 2008/0164048 | A1 | 7/2008 | Hirose | |
| 2009/0082210 | A1 | 3/2009 | Ashibe | |
| 2010/0099570 | A1 * | 4/2010 | Takayasu | H01B 12/02 505/231 |
| 2012/0015815 | A1 | 1/2012 | Allais et al. | |
| 2012/0214675 | A1 * | 8/2012 | van der Laan | H10N 60/203 505/433 |
| 2012/0214676 | A1 * | 8/2012 | Matsushita | H01B 12/02 307/147 |
| 2014/0243207 | A1 | 8/2014 | Takayasu | |
| 2014/0302997 | A1 | 10/2014 | Takayasu | |
| 2016/0155541 | A1 | 6/2016 | Jenner et al. | |
| 2017/0338009 | A1 | 11/2017 | van der Laan | |
| 2018/0226730 | A1 | 8/2018 | Fietz | |
| 2021/0350957 | A1 | 11/2021 | Takayasu et al. | |
| 2021/0376498 | A1 | 12/2021 | Craighill et al. | |

FOREIGN PATENT DOCUMENTS

| | | | | |
|---|---|---|---|---|
| CN | 102867601 | A | 1/2013 | |
| CN | 107104293 | A | 8/2017 | |
| EP | 2 827 344 | A1 | 1/2015 | |
| GB | 2355335 | A * | 4/2001 | H01B 11/06 |
| GB | 2578307 | A | 5/2020 | |
| JP | H 11-505365 | A | 5/1999 | |
| WO | WO 03/012460 | | 2/2003 | |
| WO | WO 2008/011184 | | 1/2008 | |
| WO | WO 2010/042259 | | 4/2010 | |
| WO | WO-2010039513 | A1 * | 4/2010 | H01B 12/16 |
| WO | WO-2010042259 | A1 * | 4/2010 | H01B 12/02 |
| WO | WO 2014/201242 | A1 | 12/2014 | |
| WO | WO 2021/097049 | A1 | 5/2021 | |
| WO | WO 2021/262319 | | 12/2021 | |
| WO | WO 2022/019989 | A2 | 1/2022 | |
| WO | PCT/US2022/030047 | | 5/2022 | |

OTHER PUBLICATIONS

PCT International Search Report and Written Opinion dated Feb. 5, 2024 for International Application No. PCT/US2023/077370; 22 Pages.
U.S. Non-Final Office Action dated Jan. 19, 2024 for U.S. Appl. No. 17/333,314; 7 Pages.
International Search Report and Written Opinion of the ISA dated Jun. 25, 2021 for International Application No. PCT/US2021/020916; 15 Pages.
Yanagi et al.; "Feasibility of HTS Magnet Option for Fusion Reactors"; Plasma and Fusion Research: Regular Articles; vol. 9, 1405013; 2014; 6 Pages.
Response filed Mar. 20, 2023 for European Application No. 21715028.3; 14 Pages.
Office Action dated Jun. 23, 2023 for U.S. Appl. No. 17/333,314; 9 Pages.
Restriction Requirement dated Mar. 30, 2023 for U.S. Appl. No. 17/333,314; 5 Pages.
Response to Restriction Requirement dated Mar. 30, 2023 for U.S. Appl. No. 17/333,314, filed May 30, 2023; 2 Pages.
Haight et al., "Re-Markable Joint with Insulation for REBCO Superconductor Cables", IEEE Transactions on Applied Superconductivity, Vo. 29, No. 5, Aug. 2019; 5 pages.
Imagawa et al., "Test of ITER-TF Joint Samples with NIFS Test Facilities", IEEE Transactions on Applied Superconductivity, vol. 28, No. 3, Apr. 2018; 5 Pages.
Maeda et al, "The MIRAI Program and the New Super-High Field NMR Initiative and Its Relevance to the Development of Superconducting Joints in Japan", IEEE Transactions on Applied Superconductivity, vol. 29, No. 5, Aug. 2019; 9 Pages.
Martovetsky et al., "Qualification of the Joints for the ITER Central Solenoid", IEEE Transactions on Applied Superconductivity, vol. 22, No. 3, Jun. 2012; 4 Pages.
Takahashi et al., "Development of ITER-CS Model Coil Terminal Assembling by Using Indium Wires", Fusion Engineering and Design, pp. 58-59 and 93-97; Jan. 2001; 5 Pages.
Yao et al., "R&D Activities of Joint Manufacture for ITER Poloidal Field Coil", Plasma Science Technology, vol. 17, No. 7;Jul. 2015; 6 Pages.
PCT International Search Report and Written Opinion dated Feb. 1, 2022 for International Application No. PCT/US2021/30207; 13 Pages.
Restriction Requirement dated Oct. 12, 2022 for U.S. Appl. No. 17/245,863; 6 Pages.
Response to Restriction Requirement dated Oct. 12, 2022 for U.S. Appl. No. 17/245,863, filed Nov. 30, 2022; 1 Page.
Office Action dated Dec. 21, 2022 for U.S. Appl. No. 17/245,863; 13 Pages.
Response to Office Action dated Dec. 21, 2022 for U.S. Appl. No. 17/245,863, filed Mar. 21, 2023; 9 Pages.
Notice of Allowance dated May 17, 2023 for U.S. Appl. No. 17/245,863; 9 Pages.
Hasegawa, et al.; "12 kA HTS Rutherford Cable"; IEEE Transactions on Applied Superconductivity; vol. 14; No. 2; Jun. 2004; 4 Pages.
Hasegawa, et al.; "Improvement of Superconducting Properties of Bi-2212 Round Wire and Primary Test Results of Large Capacity Rutherford Cable"; IEEE Transactions on Applied Superconductivity; vol. 11; No. 1; Mar. 2001; 4 Pages.
Kario, et al.; "Investigation of a Rutherford cable using coated conductor Roebel cables as strands"; Superconductor Science and Technology; 26; Jul. 4, 2013; 7 Pages.
PCT International Preliminary Report on Patentability dated Nov. 17, 2022 for International Application No. PCT/US2021/030207; 10 Pages.
PCT International Preliminary Report on Patentability dated Sep. 15, 2022 for International Application No. PCT/US2021/020916; 8 Pages.
Schlachter, et al.; "Coated Conductor Rutherford Cables (CCRC) for High-Current Applications: Concept and Properties"; IEEE Transactions on Applied Superconductivity; vol. 21; No. 3; pp. 3021-3024; Jun. 2011; 4 Pages.
Selvamanickam, et al.; "Fully-filamentized HTS coated conductors by striation and selective electroplating"; Coated Conductors for Applications; Nov. 13-16, 2012; 21 Pages.
Selvamanickam, et al.; "Scale Up of Applications-Ready Practical Y-Ba_Cu_O Coated Conductors"; IEEE Transactions on Applied Superconductivity; vol. 15; No. 2; Jun. 2005; 4 Pages.
Solovyov, et al.; "Electromechanical properties of narrow superconducting cables comprised of exfoliated YBCO filaments"; Aug. 22, 2017; 5 Pages.
Solovyov, et al.; "Exfoliated YBCO filaments for second-generation superconducting cable"; Superconductor Science and Technology; 30; Jan. 2017; 10 Pages.

(56) References Cited

OTHER PUBLICATIONS

Sumption, et al.; "AC loss in striped (filamentary) YBCO coated conductors leading to designs for high frequencies and field-sweep amplitudes"; Superconductor Science and Technology; 18; pp. 122-134; Jan. 2005; 14 Pages.
Takayasu, et al.; "Conductor Characterization of YBCO Twisted Stacked-Tape Cables"; IEEE Transactions on Applied Superconductivity; vol. 23; No. 3; Jun. 2013; 4 Pages.
Takayasu, et al.; "HTS twisted stacked-tape cable conductor"; Superconductor Science and Technology; 25; Jan. 2012; 22 Pages.
Takayasu, et al.; "Investigation of Twisted Stacked-Tape Cable Conductor"; American Institute of Physics; pp. 273-280; Jan. 2012; 8 Pages.
Uglietti; "A review of commercial high temperature superconducting material for large magnets: from wires and tapes to cables and conductors"; Superconductor Science and Technology; Jan. 2019; 30 Pages.
Uglietti, et al.; "Design and Strand Tests of a Fusion Cable Composed of Coated Conductor Tapes"; IEEE Transactions on Applied Superconductivity; vol. 24; No. 3; Jun. 2014; 4 Pages.
Uglietti, et al.; "Test of 60kA coated conductor cable prototypes for fusion magnets"; Superconductor Science and Technology; 28; Nov. 2, 2015; 14 Pages.
Wikipedia; "Rutherford cable"; Mar. 30, 2020; 2 Pages.
Yanagi et al.; "Design and development of high-temperature superconducting magnet system with joint-winding for helical fusion reactor"; International Atomic Energy Agency; Nucl. Fusion 55; Apr. 22, 2015; 8 Pages.
PCT International Search Report and Written Opinion dated Feb. 12, 2024 for International Application No. PCT/US2022/030047; 18 Pages.
PCT International Preliminary Report on Patentability dated Feb. 22, 2024 for International Application No. PCT/US2022/030047; 11 Pages.
Fietz et al., "High Temperature Superconductor Cables for EU-DEMO TF-Magnets;" Journal Article from Fusion Engineering and Design 125; Available Online Aug. 31, 2017; pp. 290-293; 4 Pages.
Granetz et al., "Demonstration High Temperature Superconducting Non-Planar Stellarator Magnet with Advanced Manufactured Assemblies;" PowerPoint Presentation from BETHE Kickoff Virtual Workshop; Aug. 11-12, 2020; 5 Pages.
Hartwig et al., "VIPER: An Industrially Scalable High-Current High-Temperature Superconductor Cable;" Journal Article from Superconducting Science Technology 33; Published Oct. 7, 2020; 8 Pages.
McIntyre et al., "Blocks-in-Conduit: REBCO Cable for a 20T @ 20K Toroid for Compact Fusion Tokamaks;" Proceedings of IEEE Transactions on Applied Superconductivity, vol. 31, No. 5; Aug. 2021; 5 Pages.
Takayasu et al., "Electrical and Mechanical Characteristics of HTS Twisted Stacked-Tape Cable Conductor;" Proceedings of the IEEE Transactions on Applied Superconductivity, vol. 27, No. 4; Jun. 2017; 5 Pages.
U.S. Appl. No. 18/765,682, filed Jul. 8, 2024, Craighill et al.
European Intention to Grant (with Allowed Claims) dated Sep. 20, 2024 for European Application No. 21715028.3; 42 Pages.
Response to Written Opinion dated Feb. 12, 2024 for International Application No. PCT/US2022/030047; Response Filed on Sep. 13, 2024 in European Application No. 22938736.0; 21 Pages.
European Communication to Rules 161/162 dated Sep. 27, 2024 for European Application No. 22938736.0; 3 Pages.
Response to U.S. Non-Final Office Action dated Jan. 19, 2024 for U.S. Appl. No. 17/333,314; Response Filed Apr. 19, 2024; 10 Pages.
U.S. Notice of Allowance dated May 15, 2024 for U.S. Appl. No. 17/333,314; 7 Pages.
U.S. Preliminary Amendment filed Oct. 23, 2024, 2024 for U.S. Appl. No. 18/765,682; 7 Pages.
Japanese Office Action dated Dec. 20, 2024, for Japanese Patent Application No. 2022-552786; 10 pages w/English translation provided by Espacenet.
Voluntary Amendment filed Feb. 27, 2025, for Canadian Patent Application No. 3,170,080; 8 pages.
Certificate of Grant dated Mar. 11, 2025, for European Patent Application No. 21715028.3; 2 pages.
Response to European Rule 58 Communications dated Mar. 19, 2025, for European Patent Application No. 25159526.0; Response filed May 7, 2025; 8 pages.
Japanese Office Action dated Dec. 20, 2024, for Japanese Patent Application No. 2022-552786; Response filed Apr. 23, 2025; 15 pages w/English translation provided by Espacenet.
English translation of Decision of Rejection dated Jun. 3, 2025, for Japanese Application No. 2022-552786; 5 pages.
Notice of Preliminary Rejection (with English translation) dated Jun. 27, 2025, for Korean Application No. 10-2022-7033762; 8 pages.
Response to Notice of Preliminary Rejection (with English translation) dated Jun. 27, 2025, for Korean Application No. 10-2022-7033762; Response filed Aug. 27, 2025; 20 pages.
Extended European Search Report dated Aug. 25, 2025, for European Application No. 25159526.0; 10 pages.
Notice of Allowance dated Dec. 4, 2025 for European Application No. 22938736.0; 3 Pages.
Response to Communication under Rule 161(1) EPC dated May 28, 2025 for European Application No. 23806145.1 as filed on Nov. 27, 2025; 20 Pages.

* cited by examiner

PARTITIONED SUPERCONDUCTING CABLE

CROSS REFERENCE TO RELATED APPLICATIONS

This application is a 371 National Stage Entry of International Patent Application PCT/US2021/020916 filed in the English language on Mar. 4, 2021, which application claims the benefit of U.S. provisional application No. 62/985,546, filed on Mar. 5, 2020, which application is hereby incorporated herein by reference in its entirety.

BACKGROUND

Superconductors are materials that have no electrical resistance to current (are "superconducting") below some critical temperature. For many superconductors, the critical temperature is below 30° K, such that operation of these materials in a superconducting state requires significant cooling, such as with liquid helium.

High-field magnets are often constructed from superconductors due to the capability of superconductors to carry a high current without resistance. Such magnets may, for instance, carry currents greater than 5 kA.

SUMMARY

According to some aspects, a cable is provided comprising a plurality of high temperature superconductor (HTS) components, a plurality of electrically conductive segments extending along the cable, each of the plurality of electrically conductive segments comprising one of the plurality of HTS components, and an electrically insulating material arranged between adjacent electrically conductive segments of the plurality of electrically conductive segments that electrically insulates the plurality of electrically conductive segments from one another.

According to some aspects, a magnet is provided comprising a coil comprising a plurality of windings of a cable, the cable comprising a plurality of high temperature superconductor (HTS) components, a plurality of electrically conductive segments extending along a length of the cable, each of the plurality of electrically conductive segments comprising one of the plurality of HTS components, and an electrically insulating material arranged between adjacent ones of the plurality of electrically conductive segments.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
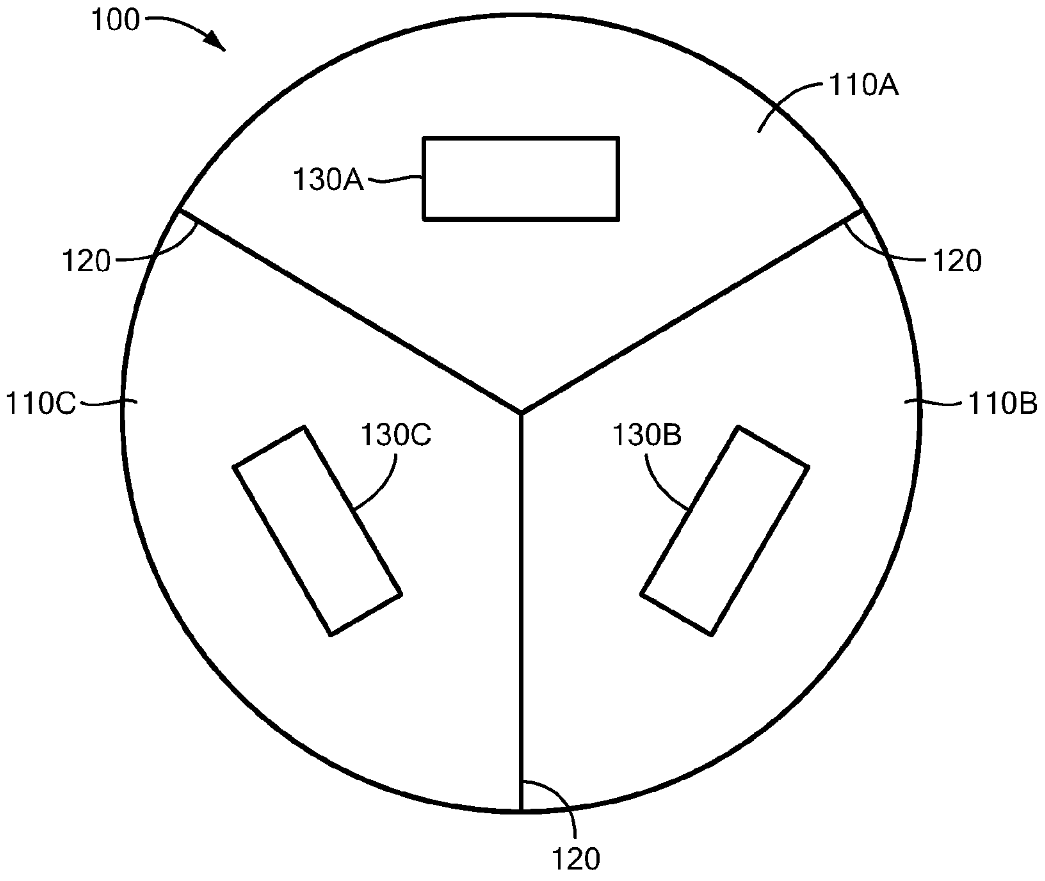
FIG. 1 illustrates a cross-sectional view of a superconducting cable, according to some embodiments.

Operating high-field magnets at high current (e.g., greater than 5 kA) may present challenges when operating in variable current mode, usually referred to as an alternating current (AC) mode. In particular, inductive heating may occur as a result of the changing magnetic field. In cases where the magnet comprises a current-carrying superconductor, such inductive heating may cause at least part of the superconductor to become non-superconducting ("normal") leading to temperature instability and possible damage to the magnet. Sources of inductive heating may include eddy currents induced within a conductor, and/or coupling currents generated within two parallel current paths that are close to one another.

A high-field superconducting magnet often comprises multiple electrically insulated cable turns grouped in a multi-layer or multi-pancake arrangement. This allows the magnet to be driven in an AC mode by changing the power supply current over time, which in turn causes the field produced by the magnet to changes over time as well. During a transient event, such as charging the magnet or discharging the magnet, each cable turn of the magnet is exposed to a variable magnetic field. As noted above, this variation in field can induce eddy currents (and therefore heating) in the electrically conducting parts of the cable. Such heating can significantly reduce the superconductor temperature margin (i.e. the difference between a temperature at which the magnet is operating and the temperature above which the superconductor may lose its superconducting characteristics). Thus, if uncontrolled, such heating can lead to the superconductor losing its superconducting abilities, often referred to as a "quench."

Conventional approaches to reduce the AC losses in a superconducting cable include reducing the size of the current-carrying wires and/or twisting the wires into a spiral. The smaller wires may reduce the size of the hysteresis losses and coupling currents that develop between parallel current paths, whereas twisting may reduce the length over which two conductive paths are parallel to one another. For instance, the so-called Cable in Conduit Conductor (CICC) braided cable approach includes small diameter filaments embedded and twisted together with conductive wires.

These approaches are very difficult or impossible to implement with respect to high temperature superconductors (HTS), however, which are typically not formed from wires. Rather, an HTS cable typically comprises a superconductor component having a wide aspect ratio, which is often referred to as a "tape." It can be challenging to reduce the size of such a tape into smaller units and also to twist the highly aspected tape, however. As such, conventional approaches to reduce AC losses in a superconducting cable may be ineffective for HTS cables.

The inventors have recognized and appreciated concepts, structures, processes and techniques for reducing eddy current and/or current coupling heating in a superconducting cable by arranging resistive layers within the structural components of the cable. In particular, the structure that supports the current-carrying components may be partitioned and at least partially insulated between the partitions. Introduction of such resistive layers has been observed to reduce eddy currents and coupling heating by a significant factor, as discussed further below.

In at least some implementations, the current-carrying components such as HTS tape may be otherwise configured as in conventional approaches. For instance, a cable may comprise an electrically conducting structure that supports one or more HTS tapes. The electrically conducting structure, sometimes referred to as a "former," may be partitioned so that separate segments of the former each support one or more HTS tapes and so that the separate segments are separated from one another by electrically insulating material. In cases where a plurality of HTS tapes are supported by one segment of the former, the HTS tapes may be arranged in a stack, layered on top of each other along a direction that is the same as the smallest dimensional axis of the tape (e.g., tapes that are long, wide and have a small thickness are layered in the thickness direction).

According to some embodiments, a superconducting cable may include a number of segments comprising at least one HTS. In some cases, the segments are radial segments comprising at least one HTS. In some cases, the radial segments may exhibit radial symmetry. Each segment may comprise a separate and independent current-carrier that includes, or is composed of, an HTS, and an electrical insulator may be arranged between the radial segments. As a result, the cable may comprise multiple current-carrying regions separated by insulators.

According to some embodiments, a superconducting cable may comprise a central cooling channel. This channel may pass through an interior of the cable and be adjacent to the multiple partitions of the structure that supports the current-carrying components, thereby providing cooling to the multiple partitions and to the HTS components supported by the multiple partitions. In some cases, the channel may be formed by omitting regions of the partitions of the cable to form an interior hollow space. Additionally, or alternatively, the channel may be formed by a tubular element that passes through the interior of the cable and provides support to the cooling channel. Such a tubular element may comprise the same, or different, material(s) than the partitions of the structure that support the current-carrying components.

According to some embodiments, a superconducting cable may comprise a number of partitions of the structure that supports the current-carrying components that are twisted about a common axis. Each partition of the structure may, for instance, follow a helical path while supporting a respective one of the current-carrying components.

Following below are more detailed descriptions of various concepts related to, and embodiments of, techniques for reducing eddy current and/or current coupling heating in a superconducting cable. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates a cross-sectional view of a superconducting cable, according to some embodiments. In the example of FIG. 1, cable 100 comprises a plurality of electrically conductive segments, here three electrically conductive segments 110, which are separated from one another by an electrically insulating material 120. Each of the electrically conductive segments 110*a*, 110*b*, 110*c* generally referred to herein as 110 supports, and is in electrical contact with, a respective superconductor component 130*a*, 130*b*, 130*c* generally referred to herein as 130. As discussed above, electrically insulating material 120 may reduce eddy currents and coupling heating (and in some cases by a significant factor) compared with a cable that utilizes a single region of electrically conductive material to support each of the superconductor components of the cable. The insulating material 120 fully insulates each of the electrically conductive segments 110 from one another.

During operation of the cable 100, at least the superconductor components 130 are cooled to below their superconducting transition so that they may carry current at zero resistance. The electrically conductive segments 110 act as stabilizers during a quench: when one of the superconductor components 130 quenches, heat may be conducted through the electrically conductive segment that supports the quenched superconductor component to the other electrically conductive segments, thereby quenching the whole cross section of the cable. Subsequently, a non-superconducting zone within superconductor components 130 may be created and propagate along the cable.

According to some embodiments, each electrically conductive segment 110 may be arranged in electrical contact with a respective superconductor component 130. Such contact may occur as a result of direct physical contact between the electrically conductive segment and the respective superconductor component, and/or may occur as a result of indirect contact via an intermediate electrically conductive material.

In the example of FIG. 1, the electrically conductive segments 110 are arranged in a radially symmetric manner around a central axis of the cable. This configuration may provide for simpler fabrication of the cable, since the electrically conductive segments may be fabricated with the same cross-sectional dimensions, then assembled in the cable 100. Notwithstanding these advantages, the techniques described herein are not limited to electrically conductive segments exhibiting such symmetry, as any suitable size and shape of electrically conductive segments may be employed in a cable.

According to some embodiments, electrically conductive segments 110 may comprise, or may consist of, copper. Copper may represent a desirable material due to its high thermal conductivity, thereby providing a stabilizing function in case of a quench, as well as being electrically conductive. Other suitable materials that electrically conductive segments 110 may comprise, or may consist of, include aluminum.

According to some embodiments, electrically insulating material 120 is arranged to contact different ones of the electrically conductive segments 110 on either side. As shown in FIG. 1, electrically insulating material 120 is arranged between adjacent pairs of the electrically conductive segments 110, and may be arranged so as to contact both segments of the pair (ideally, so as to leave no gaps, or substantially no gaps, between the electrically insulating material 120 and each electrically conductive segment). In some embodiments, the insulating material 120 may be provided in the form of a tape that may be arranged between the pairs of the electrically conductive segments 110. In some cases, the tape may be an adhesive tape and adhered to the adjacent electrically conductive segments 110 via the adhesive so that the tape is adhered to the electrically conductive segments.

According to some embodiments, superconductor components 130 may comprise one or more high temperature superconductors (HTS). As used herein, a "high temperature superconductor" or "HTS" refers to a material that has a critical temperature above 30° K, wherein the critical temperature refers to the temperature below which the electrical resistivity of the material is zero. The critical temperature can in some cases depend on other factors such as the presence of an electromagnetic field. It will be appreciated that where the critical temperature of a material is referred to herein, this may refer to whatever the critical temperature happens to be for that material under the given conditions.

In some embodiments, superconductor components 130 may comprise an HTS tape, which is a long, thin strand of HTS material with cross-sectional dimensions in the range of about 0.001 mm to about 0.1 mm in thickness (or height) and a width in the range of about 1 mm to about 12 mm (and with a length that extends along the length of the cable, i.e., into and out of the page in the example of FIG. 1). In some embodiments, HTS tape may comprise a polycrystalline HTS and/or may have a high level of grain alignment. In some embodiments, superconductor components 130 may comprise a stack of HTS tapes, being a plurality of HTS tapes arranged on top of one another along the width and length directions. An HTS tape stack may thereby have a thickness equal to (or approximately equal to) the thickness of an individual tape multiplied by the number of tapes in the stack.

According to some embodiments, insulating material 120 may comprise polyimide (e.g., Kapton®), epoxy resin, phenolic resin, a plastic, an elastomer, steel (e.g., stainless steel) or combinations thereof. According to some embodiments, insulating material may have a breakdown voltage or dielectric strength of greater than 25 kV/mm, of greater than 50 kV/mm, of greater than 75 kV/mm, of greater than 1000 kV/mm.

In some embodiments, insulating material 120 may comprise, or may consist of, a high-resistivity material that is nonetheless electrically conductive to some extent. In this respect, references to material 120 being "insulating" refers to the fact that the material 120 is much less electrically conductive than the material making up the electrically conductive segments 110. For instance, in some embodiments, the electrically conductive segments 110 may comprise a highly conductive material such as copper, whereas the insulating material 120 may comprise steel, which is not strictly an insulator but is nonetheless far more insulating than copper.

In the example of FIG. 1, the electrically conductive segments 110 may provide mechanical integrity to the cable in addition to the aforementioned advantages with respect to quenching behavior. The electrically conductive segments 110 may be formed into or may conform to a desired shape and may provide a substantial amount of structural strength to the cable. This is in contrast to other superconducting cables such as the Cable in Conduit Conductor (CICC) braided cables discussed above, which feature twisted copper rods that can deform under high electromagnetic loads.

According to some embodiments, electrically conductive segments 110 may be twisted along the length of the cable 110. That is, the electrically conductive segments 110 may be twisted around a central longitudinal axis of the cable; as such, the cross-sectional view of FIG. 1 may be accurate at various points along the cable but for the rotational orientation of the view shown, which will rotate about the center of the cable as the cross-sectional view is moved along the length of the cable. A helical path is one example of a twisted path that the electrically conductive segments may follow around the central longitudinal axis of the cable. In such a configuration, the electrically conductive segments 110 may be aligned along respective helical paths with a center of each helix being the central longitudinal axis of the cable. Similarly, the superconductor components 130 may be supported by the electrically conductive segments 110 along the length of the cable in the manner shown in FIG. 1, and thereby also be aligned along respective helical paths with a center of each helix being the central longitudinal axis of the cable. Arranging the superconductor components 130 along twisted paths may reduce the length over which two conductive paths are parallel to one another, and thereby reduce this source of inductive heating.

According to some embodiments, cable 100 may comprise one or more cooling channels, such as tubular cooling channels that may run along the longitudinal axis of the cable. Although the example of FIG. 1 does not illustrate any cooling channels, in general any number of channels may be formed or otherwise provided through the cable to provide cooling to the electrically conductive segments 110 and/or to the superconductor components 130. Such channels may for instance provide a path for cryogenic liquid such as liquid helium or liquid nitrogen to flow and carry heat away from the electrically conductive segments 110 and/or the superconductor components 130. In some cases, one or more cooling channels may be arranged in contact with, or in close proximity to, the electrically conductive segments 110. In such cases, cooling of the superconductor components 130 may be achieved indirectly through cooling of the electrically conductive segments. In other cases, one or more cooling channels may be arranged in contact with, or in close proximity to, the superconductor components 130. Coolant may be provided through a cooling channel at a high pressure, such as above 2 bar.

Although not explicitly shown in FIG. 1, according to some embodiments, cable 100 may comprise a jacket arranged exterior to the electrically conductive segments 110. A jacket may provide additional structural stability over and above that provided by the electrically conductive segments 110, and may for instance comprise, or may consist of, steel, Inconel®, Nitronic® 40, Nitronic® 50, Incoloy®, or combinations thereof.

Figure 2A:
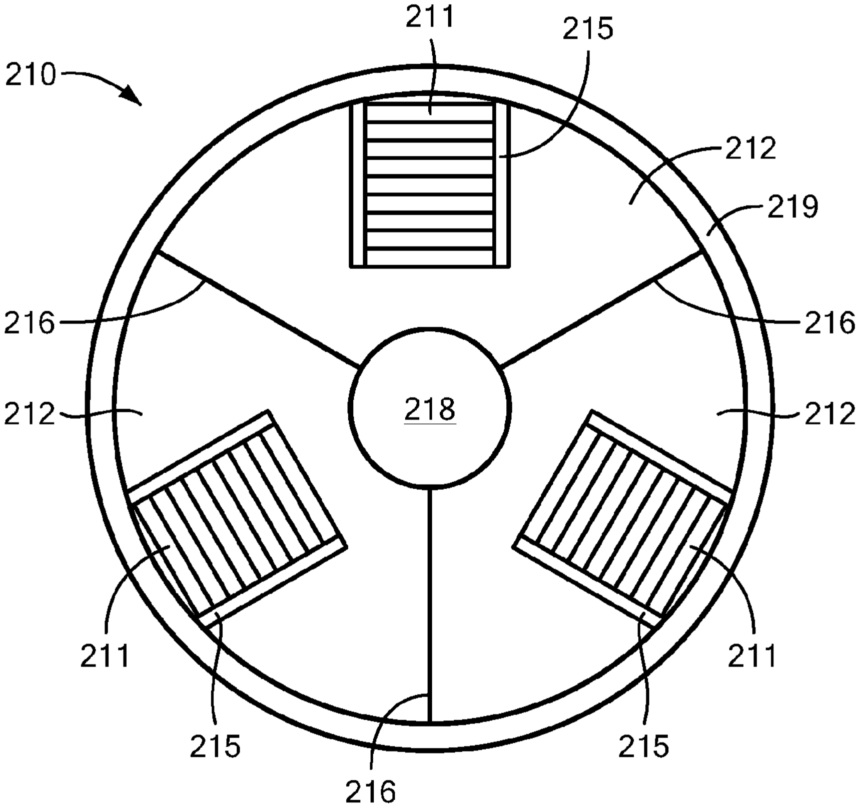
FIGS. 2A and 2C illustrate cross-sectionals views of illustrative superconducting cables, according to some embodiments.
Figure 2B:
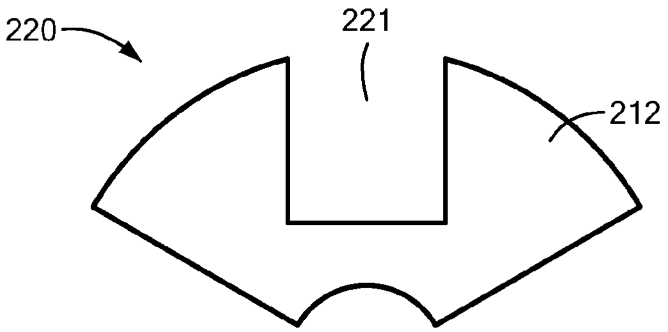
FIGS. 2B and 2D illustrate single electrically conductive segments corresponding to portions of the illustrative superconducting cables of FIGS. 2A and 2C, respectively, according to some embodiments.

FIG. 2A illustrates a cross-sectional view of a superconducting cable, according to some embodiments. Cable 210 is an example of cable 100 shown in FIG. 1 that includes electrically conductive segments 212 arranged in a radially symmetric manner around a central cooling channel 218. The electrically conductive segments 212 are configured to hold respective HTS tape stacks 211 within respective channels 221 (FIG. 2B) within each segment. In the example embodiment of FIG. 2A, the channels 221 are arranged at a perimeter of each segment. FIG. 2B illustrates a single electrically conductive segment 212 separately from cable 210 to depict the channel 221. It may be noted that cable 210 may be produced from three instances of the same electrically conductive segment 212 arranged as shown in FIG. 2A. The illustrative cable of FIG. 2A comprises a jacket 219 arranged exterior to the electrically conductive segments. According to some embodiments, jacket 219 may comprise, or may consist of, steel, Inconel®, Nitronic® 40, Nitronic® 50, Incoloy®, or combinations thereof.

In the example of FIG. 2A, the HTS tape stacks 211 are arranged in contact with an alloy 215, which provides at least part of the electrical contact between the HTS tape stacks and each respective electrically conductive segment 212. As discussed further below, one technique to produce electrical contact between the HTS tape and the electrically conductive segment is to fill space between the tape and the segment with a liquid alloy such as solder. As such, the alloy 215 may comprise, or may consist of, a Pb and/or Sn solder. In some embodiments, the alloy 215 may comprise a metal having a melting point of less than 200° C., wherein at least 50 wt % of the metal is Pb and/or Sn, and at least 0.1 wt % of the metal is Cu.

Figure 2C:
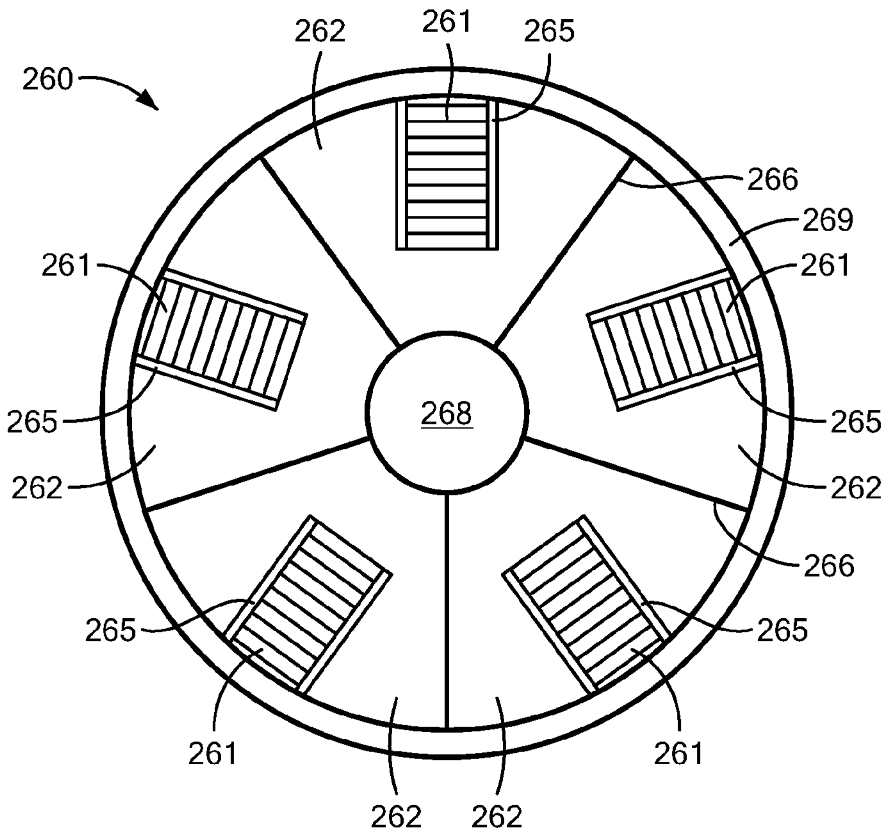
Figure 2D:
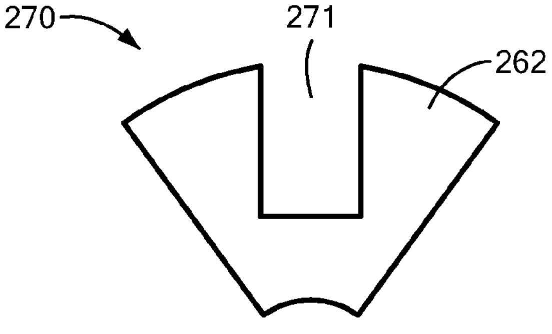

FIG. 2C illustrates a cross-sectional view of a superconducting cable, according to some embodiments. Cable 260 is an example of cable 100 shown in FIG. 1 that includes electrically conductive segments 262 arranged in a radially symmetric manner around a perimeter of a central cooling channel 268. The electrically conductive segments 262 are configured to hold respective HTS tape stacks 261 within respective channels arranged within each segment. In the example embodiment of FIG. 2C, the channels 271 are arranged at a perimeter of each segment. FIG. 2D illustrates a single electrically conductive segment 262 separately from cable 260 to depict the channel 271. It may be noted that cable 260 may be produced from five instances of the same electrically conductive segment 262 arranged as shown in FIG. 2C. According to some embodiments, jacket 269 may comprise, or may consist of, steel, steel, Inconel®, Nitronic® 40, Nitronic® 50, Incoloy®, or combinations thereof.

In the example of FIG. 2C, the HTS tape stacks 261 are arranged in contact with an alloy 265, which provides at least part of the electrical contact between the HTS tape stacks and each respective electrically conductive segment 262. As discussed further below, one technique to produce electrical contact between the HTS tape and the electrically conductive segment is to fill space between the tape and the segment with a liquid alloy such as solder. As such, the alloy 265 may comprise, or may consist of, a Pb and/or Sn solder. In some embodiments, the alloy 265 may comprise a metal having a melting point that is at least 20° C. and less than 200° C., wherein at least 50 wt % of the metal is Pb and/or Sn, and at least 0.1 wt % of the metal is Cu.

In the examples of FIGS. 2A-2D the channels of the electrically conductive segments in each cable that house the HTS tape stacks are depicted as being rectangular in cross-section, though it will be appreciated that the channels are not limited to this shape. For example, the channels of the electrically conductive segments may be a groove into which a superconductor may be inserted so that the channels have a curved inner surface.

Figure 3A:
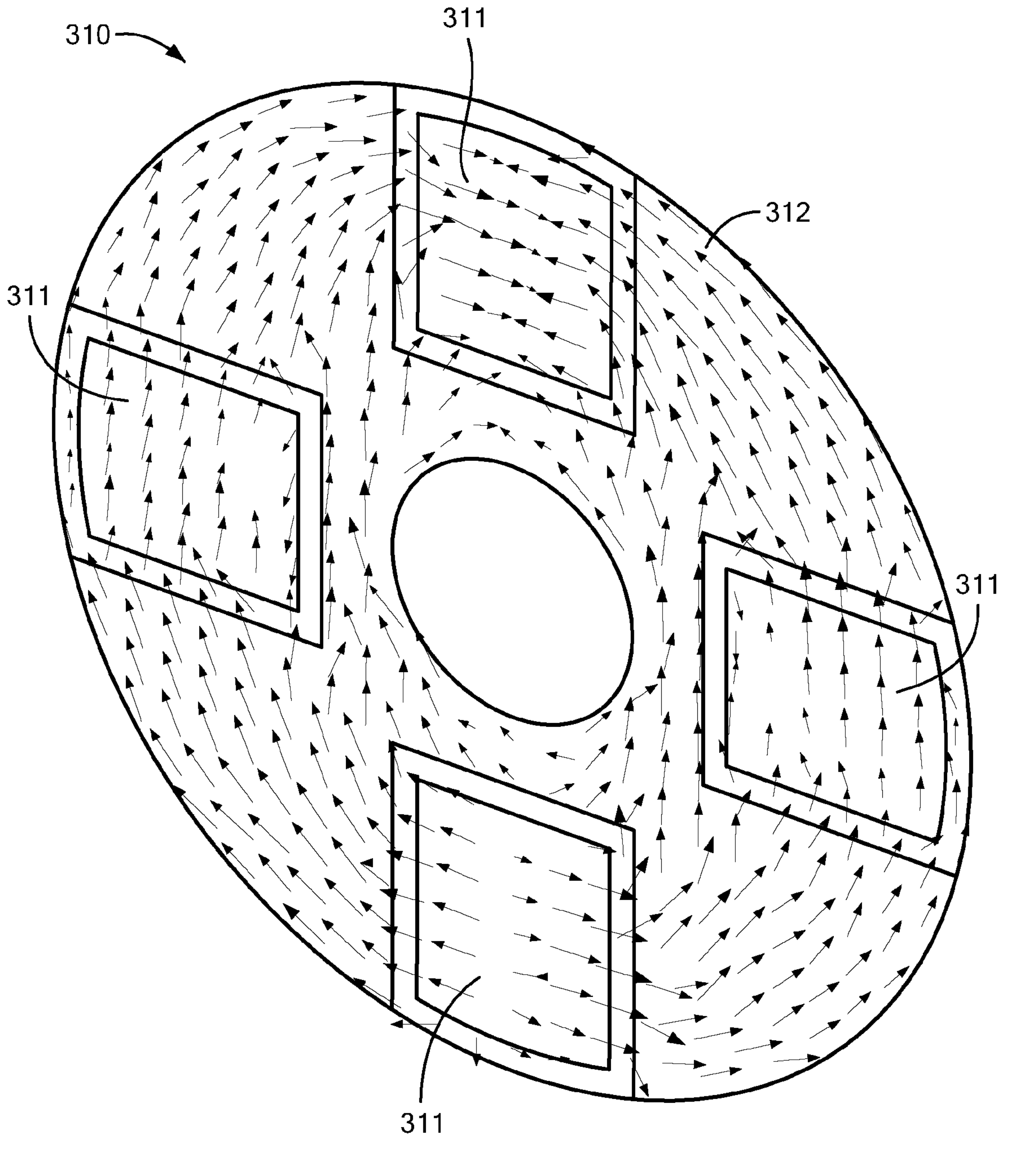
FIG. 3A depicts eddy currents within a superconducting cable having a single conductive structure supporting multiple high temperature superconductor (HTS) tape stacks, according to some embodiments

FIG. 3A depicts eddy currents within a superconducting cable having a single conductive structure supporting multiple HTS tape stacks, according to some embodiments. As may be noted from the illustrative example of FIG. 3A, eddy currents represented by arrows may circulate around the cross section of the cable 310 and through the HTS tape stacks 311. As shown in the example of FIG. 3A, the cable includes a single conductive structure 312 that supports all four of the HTS stacks 311.

Figure 3B:
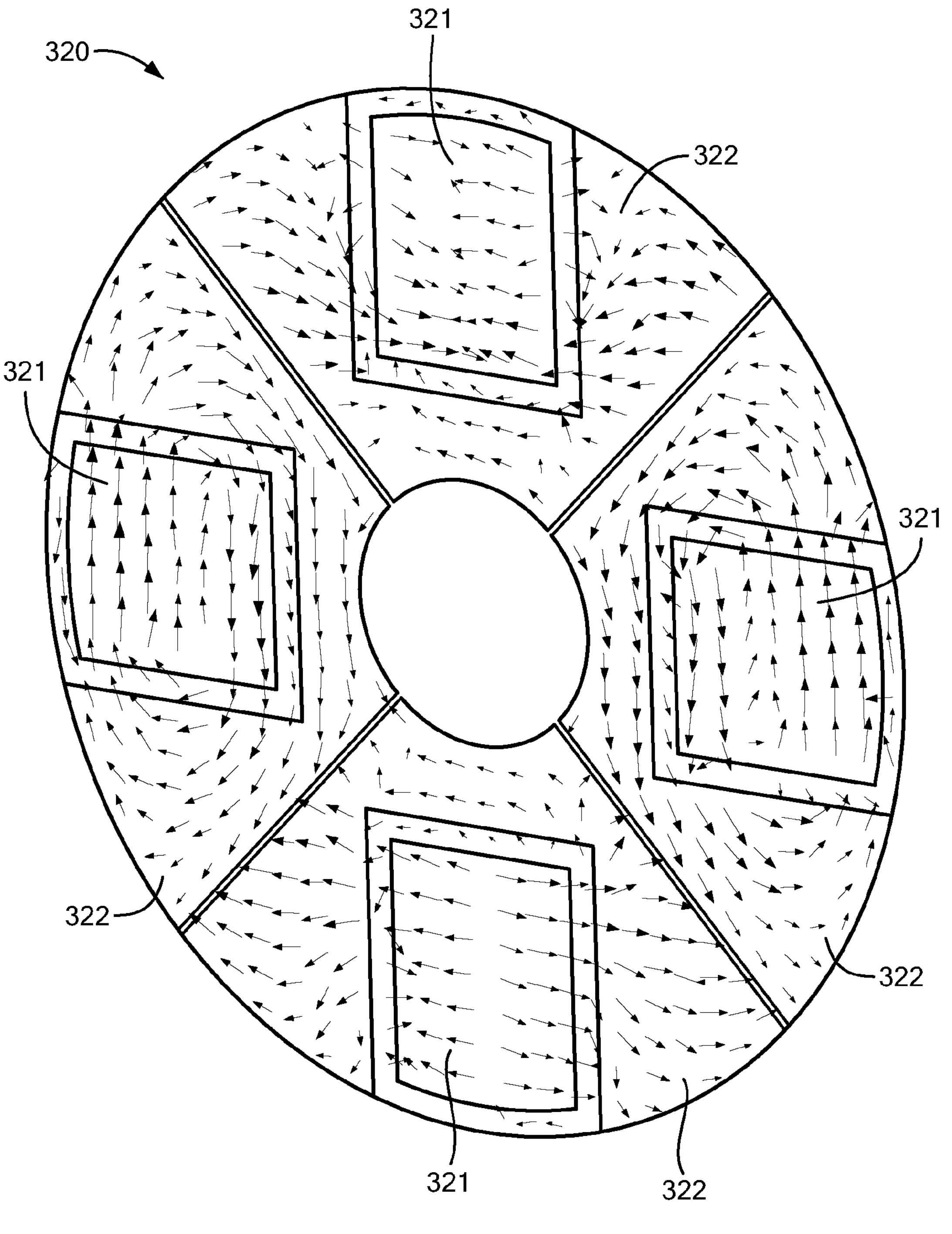
FIG. 3B depicts eddy currents within a superconducting cable comprising four electrically conductive segments each supporting a separate HTS tape stack and comprising insulating material between the segments, according to some embodiments.

In contrast, FIG. 3B depicts eddy currents within a superconducting cable comprising four electrically conductive segments 322 each supporting a separate HTS tape stack 321 and comprising insulating material between the segments, according to some embodiments. As may be noted from the illustrative example of FIG. 3B, eddy currents represented by arrows circulate within cable 320 in much smaller paths within each separate electrically conductive segment 322 when compared with the paths shown in FIG. 3A. As a result of the smaller current loops in cable 320, inductive heating in the cable is expected to be much lower than in cable 310 when both cables operate in an AC mode.

Figure 4A:
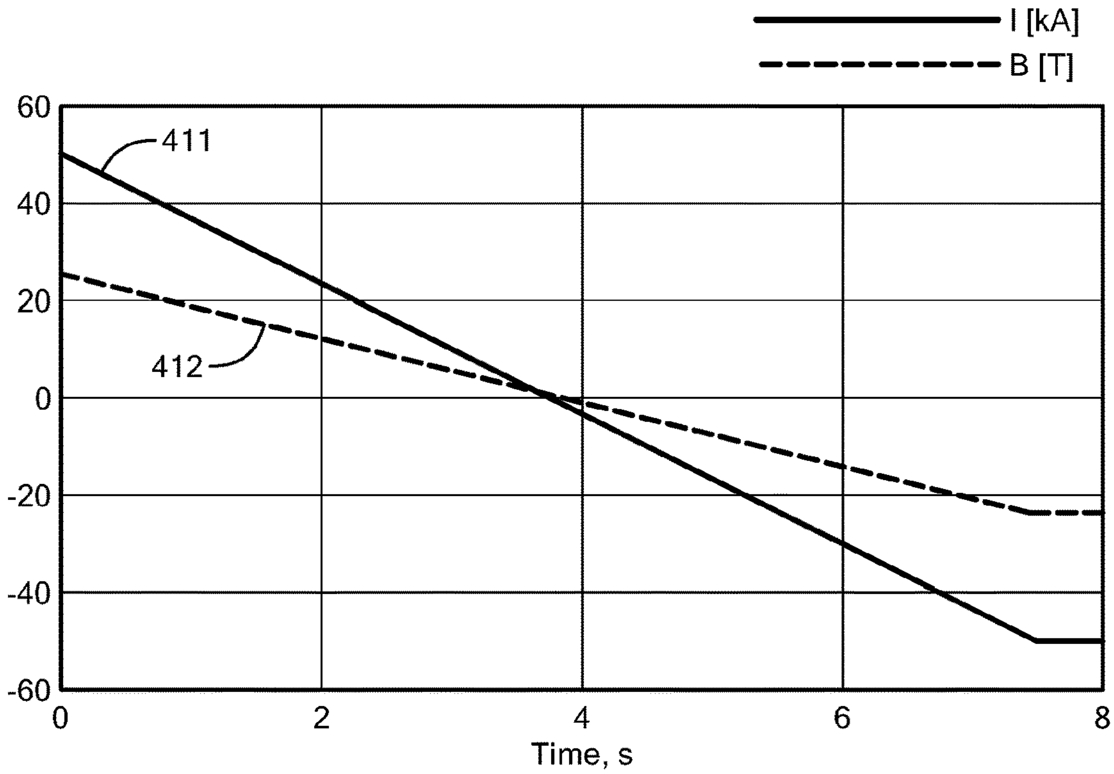
FIGS. 4A-4C illustrate performance differences between a superconducting cable that has a single conductive structure supporting multiple HTS tapes and a superconducting cable comprising multiple electrically conductive segments and insulating material between the segments, according to some embodiments.
Figure 4B:
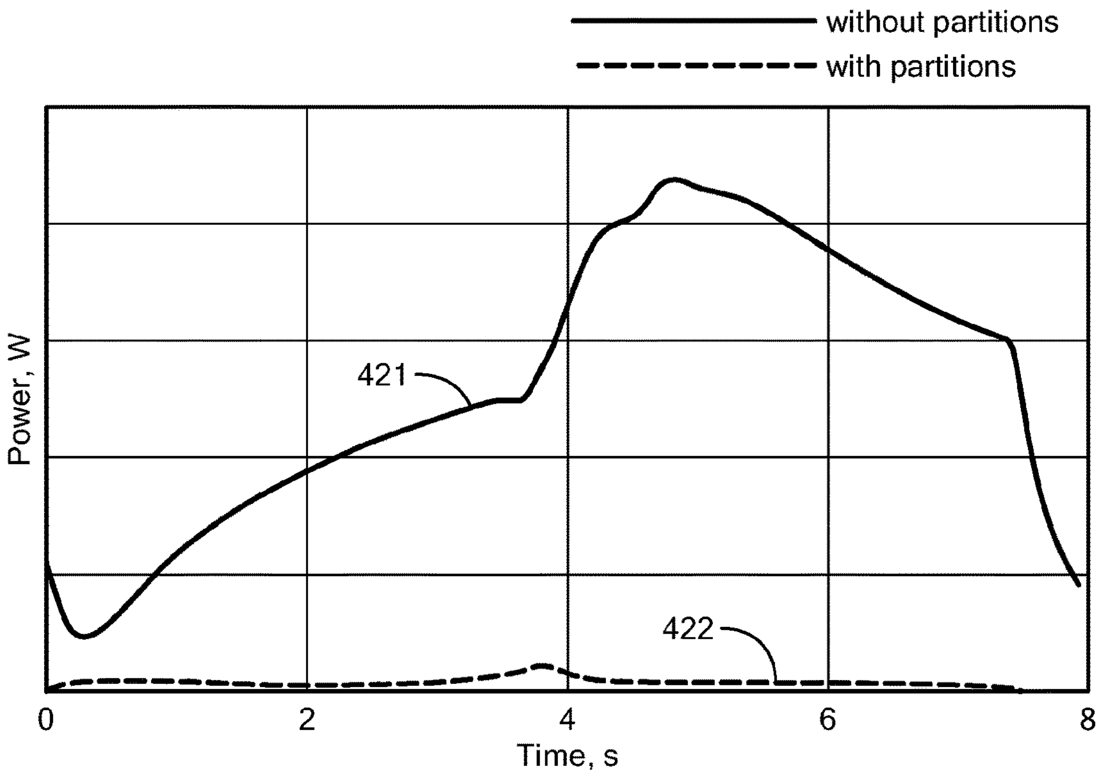
Figure 4C:
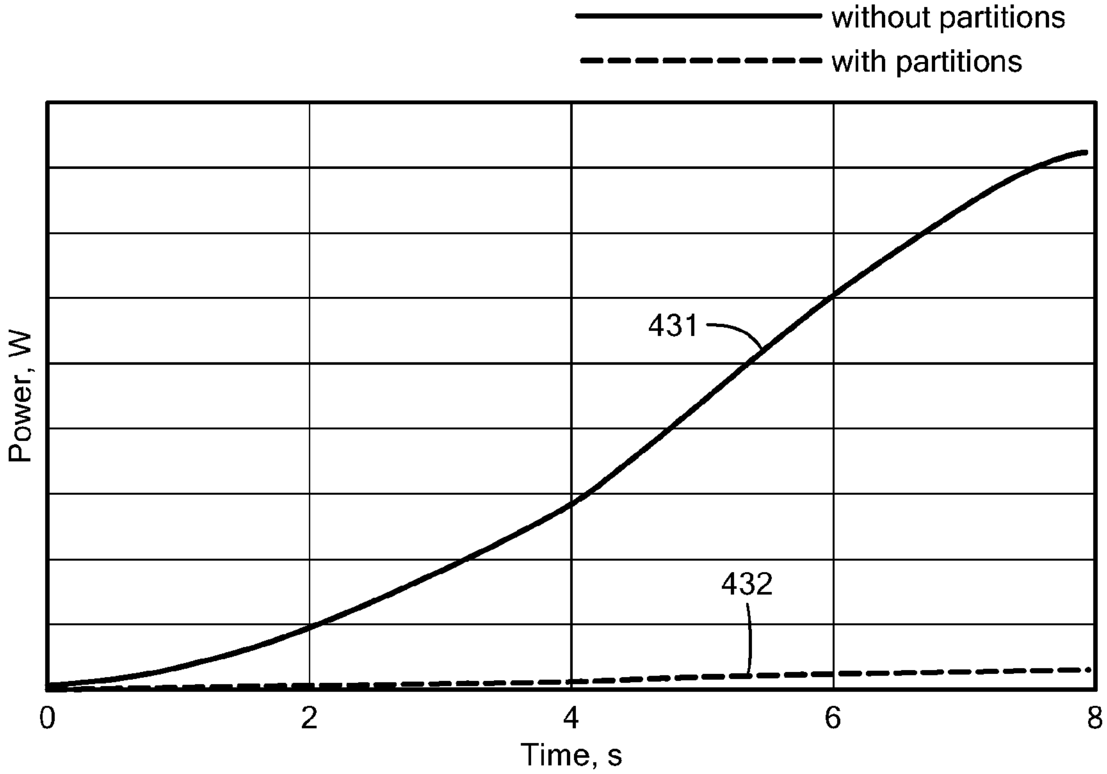

FIGS. 4A-4C further illustrate the performance differences between a superconducting cable that has a single conductive structure supporting multiple HTS tapes and a superconducting cable comprising multiple electrically conductive segments and insulating material between the segments, according to some embodiments. FIGS. 4A-4C depict results of finite element modeling of cables of these types when each is subjected to a current sweep of the transverse external magnetic field, as shown in FIG. 4A. Specifically, as shown in FIG. 4A, a 7.5 second +50 kA/−50 kA transport current sweep was simulated in a +25 T/−25 T sweep of the transverse external magnetic field.

As shown in FIG. 4B, which depicts a qualitative amount of power deposited in the cable by eddy currents over time, the sweep produces a much greater amount of power in the conventional cable (light gray) than in the cable comprising multiple electrically conductive segments (black). Similarly, as shown in FIG. 4C, which depicts a qualitative energy deposited in the cable by eddy currents over time, the sweep deposits a much greater amount of energy in the conventional cable (light gray) than in the cable comprising multiple electrically conductive segments (black).

Figure 5:
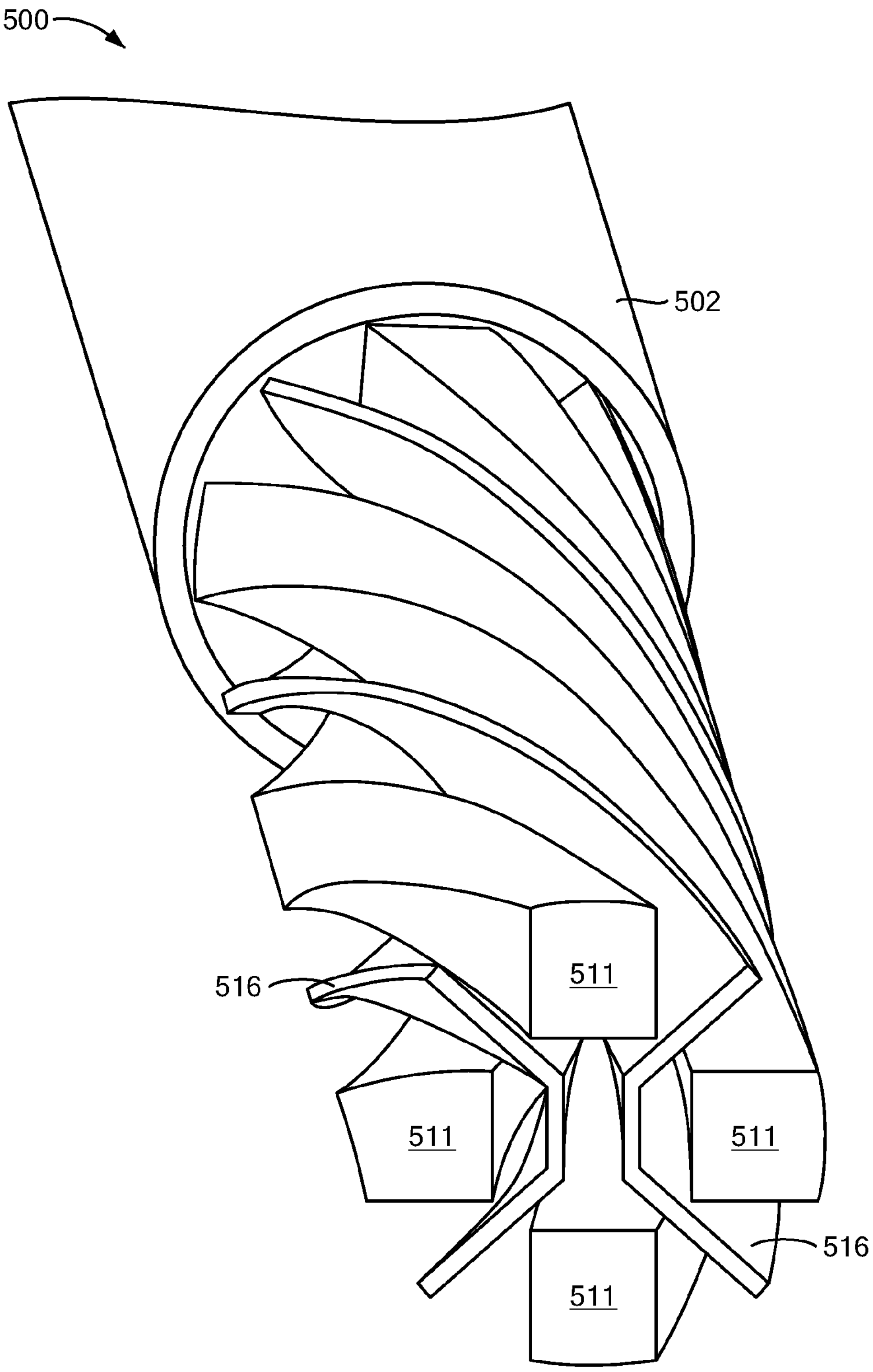
FIG. 5 depicts a partially cut-away isometric view of a portion of a superconducting cable comprising multiple electrically conductive segments that are twisted, according to some embodiments.

FIG. 5 is an isometric view of a superconducting cable having portions of an outer jacket 502 removed to reveal multiple electrically conductive segments in a twisted configuration. As discussed above in relation to FIG. 1, in some embodiments the multiple electrically conductive segments may be twisted around a common axis along the length of the cable (e.g. a common central longitudinal axis of the cable). This configuration is shown in FIG. 5, which depicts cable 500 comprising superconductor components 511 and insulating portions 516; the intervening electrically conductive segments which fill the space between the superconductor components and the insulating portions are not shown for clarity. As discussed above, arranging the superconductor components in a twisted shape may reduce the length over which two conductive paths are parallel to one another, and thereby reduce this source of inductive heating. Combined with the reduction in the size of eddy current loops afforded by the insulated electrically conductive segments as discussed above, inductive heating may be dramatically reduced.

Figure 6C:
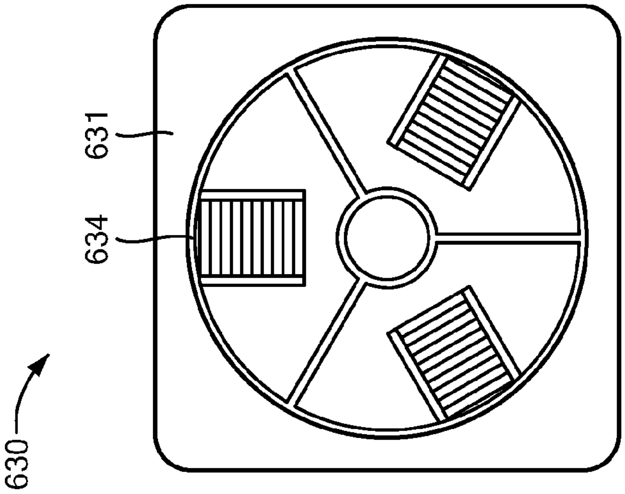
FIGS. 6A-6C are a series of cross-sectional views of a superconducting cable that depict various external insulation arrangements, according to some embodiments.
Figure 6B:
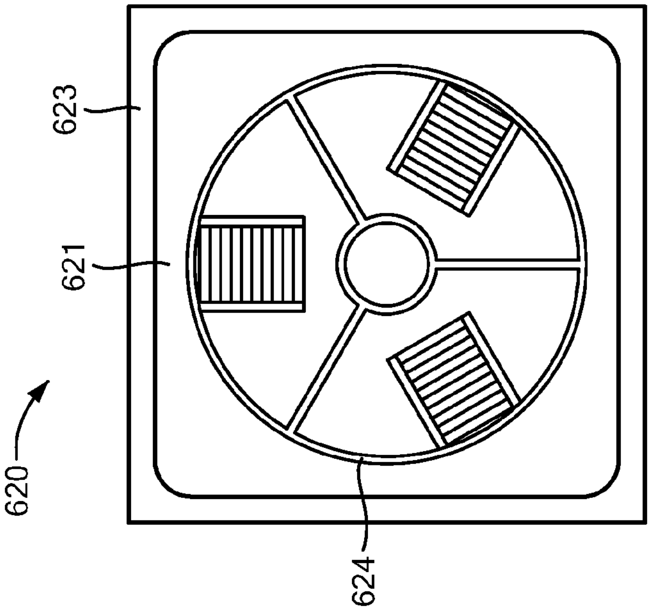
Figure 6A:
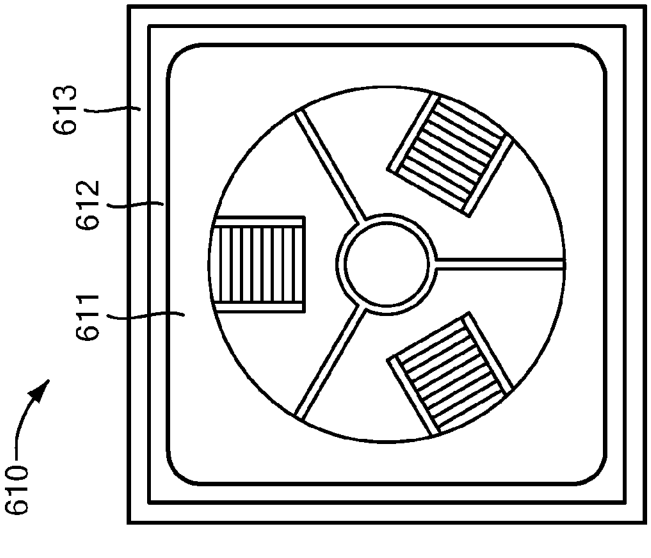

FIGS. 6A-6C depict cross-sectional views of a superconducting cable with various external insulation arrangements, according to some embodiments. For purposes of illustration, a cable similar to that shown in FIG. 2A is depicted in FIGS. 6A-6C with the various external insulation arrangements. In the example of FIG. 6A, cable assembly 610 comprises a cable surrounded by a jacket 611 (e.g., a stainless steel jacket), which is wrapped in a first dielectric layer (e.g., a layer of polyimide such as Kapton®, a fiberglass cloth) 612, around which is provided a second dielectric layer (e.g., fiberglass) 613.

In the example of FIG. 6B, cable assembly 620 comprises a first dielectric layer (e.g., a polyimide layer, fiberglass cloth) 624 arranged around a cable, around which a jacket 621 is arranged. A second dielectric layer (e.g., a layer of fiberglass) 623 surrounds the jacket 621 (e.g., a stainless steel jacket).

In the example of FIG. 6C, cable assembly 630 comprises a dielectric layer (e.g., a polyimide layer, fiberglass cloth) 634 arranged around a cable, and a jacket 631 (e.g., a stainless steel jacket) arranged around the cable and dielectric 634.

In some embodiments, a cable assembly may be wrapped in a dielectric (e.g., fiberglass cloth, polyimide) and then vacuum pressure impregnated to fill the remaining space between the cable turns with a dielectric, such as an epoxy resin. For instance, the cable assembly may be wrapped in a first dielectric, arranged in a number of turns, then vacuum pressure impregnated with epoxy. The epoxy may be cured via thermal means or otherwise.

In some embodiments, a cable assembly may be arranged within a structural matrix. For instance, the jacket may comprise a number of channels in which windings of a cable assembly (or windings of multiple cable assemblies) may be arranged. As such, the jacket may act as a structural support (e.g., structural plate) supporting multiple windings of one or more cable assemblies. Such a jacket may be surrounded by one or more dielectric layers as described above, in some embodiments.

Figure 7:
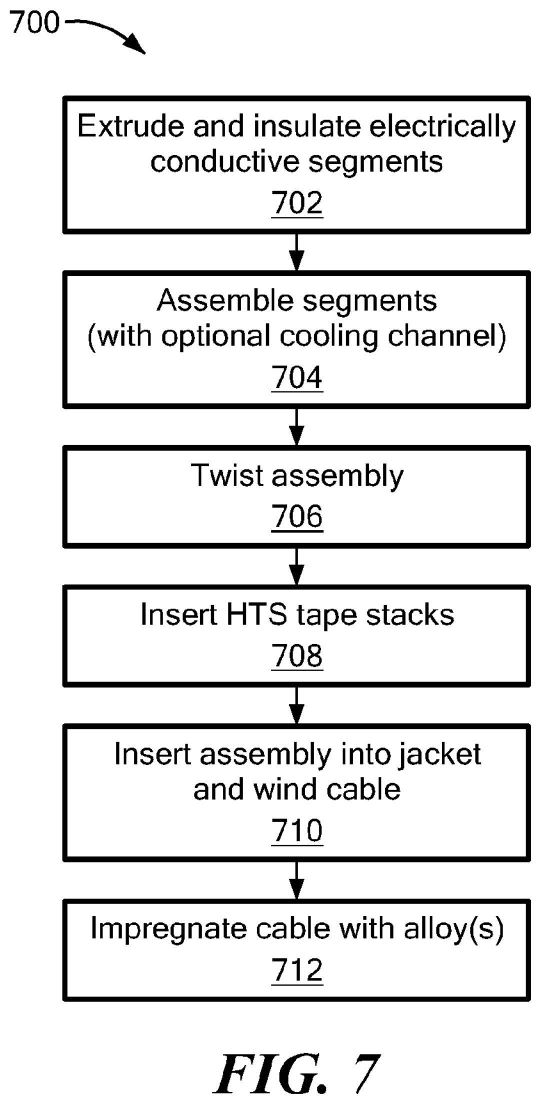
FIG. 7 is a flowchart of a method of fabricating a superconducting cable, according to some embodiments.

FIG. 7 is a flowchart of a method of fabricating a superconducting cable, according to some embodiments. Method 700 begins in act 702 in which a plurality of electrically conductive segments are fabricated. Such fabrication may be accomplished through any subtractive or additive process including, but not limited to extrusion, machining and/or additive fabrication. For instance, structures may be fabricated (e.g., from a metal such as copper) having the cross-section shown in FIG. 2B or FIG. 2D (or any other cross-section suitable for subsequent insertion of a superconductor component and arrangement into a cable). In act 702, the segments are also insulated with a suitable insulation material such as polyimide and/or any other dielectric. In some embodiments, the insulation material may be a tape, which may comprise an adhesive on either or both sides via which the insulation material may be adhered to the electrically conductive segments.

In act 704, the electrically conductive segments fabricated in act 702 are assembled into a single structure. Optionally in act 702, a cooling channel may be assembled, formed or otherwise provided via the electrically conductive segments. For example for the cable shown in FIG. 2A, a central cooling channel may be arranged with insulation around it in the center with the multiple electrically conductive segments surrounding it.

In act 706, the assembled collection of electrically conductive segments (and optional cooling channel) may be twisted to produce a shape like that shown in FIG. 5. For example, the assembly may be twisted along its length by holding the ends of the assembly in place and rotating them with respect to one another.

In act 708, HTS tape stacks may be inserted into channels or other cavities within the assembled electrically conductive segments. In some cases, the HTS tape stacks may be fed into such channels or cavities, as sufficient space may be provided in the channels or cavities present in the electrically conductive segments to allow the HTS tape stacks to be safely pushed through the cable assembly. In act 710, the assembly is inserted into a jack provided for structural stability (e.g., a stainless steel jacket) and the resulting cable wound into a desired shape.

In act 712, any empty space present within channels or cavities of the cable (except for the cooling channel) may be filled by impregnating the space with a suitable alloy. In some embodiments, a vacuum pressure impregnation (VPI) process may be performed to fill the space with a Pb and/or Sn solder. Such a process may comprise one or more of the following steps: cleaning the empty space within the cable using an acidic solution following by a water rinse; evacuating the space within the cable; purging the space with an inert gas; depositing flux into the space to coat the HTS tape and the electrically conductive segments; draining any excess flux from the cable; heating the cable to a temperature below, at or above a temperature at which the alloy to be deposited will melt; and flowing a molten alloy (e.g., a PbSn solder) into the cable. In some embodiments, the HTS tape may be pre-tinned with a metal (e.g., a PbSn solder) to promote a good bond between the HTS tape and the alloy.

Figure 8:
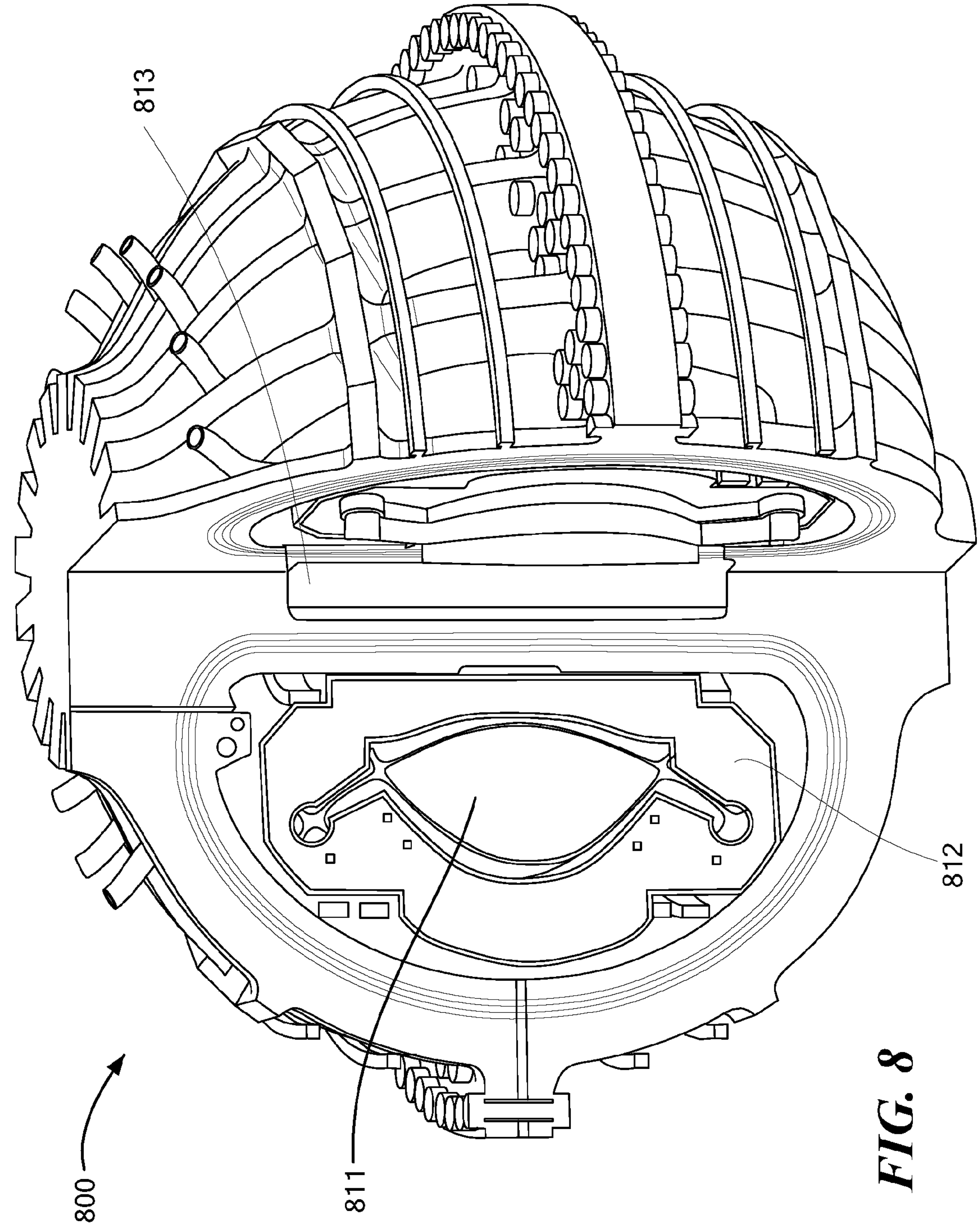
FIG. 8 is a perspective view of a fusion power plant having a portion removed therefrom to illustrate various components of the power plant, according to some embodiments.

FIG. 8 is a three-dimensional graphic of a fusion power plant with a cutaway portion illustrating various components of the power plant, according to some embodiments. A magnet within a fusion power plant may be formed from a superconducting cable as described above. FIG. 8 shows a cross-section through a power plant and includes a magnet coil 813, which is fabricated from, or otherwise includes, a superconducting cable as discussed and described above, a neutron shield 812, and a core region 811. According to some embodiments, the magnet coil 813 may be, or may form part of, a central solenoid and/or other poloidal field solenoidal coils.

Persons having ordinary skill in the art may appreciate other embodiments of the concepts, structures, processes, results, and techniques disclosed herein. It is appreciated that superconducting cables configured according to the concepts, structures, processes and techniques described herein may be useful for a wide variety of applications, including applications in which the superconducting cable is wound into a coil to form a magnet. For instance, one such application is conducting nuclear magnetic resonance (NMR) research into, for example, solid state physics, physiology, or proteins, for which such cables may be wound into a magnet. Another application is performing clinical magnetic resonance imaging (MRI) for medical scanning of an organism or a portion thereof, for which compact, high-field magnets are needed. Yet another application is high-field MRI, for which large bore solenoids are required. Still another application is for performing magnetic research in physics, chemistry, and materials science. Further applications is in magnets for particle accelerators for materials processing or interrogation; electrical power generators; medical accelerators for proton therapy, radiation therapy, and radiation generation generally; superconducting energy storage; magnetohydrodynamic (MHD) electrical generators; and material separation, such as mining, semiconductor fabrication, and recycling. It is appreciated that the above list of applications is not exhaustive, and there are further applications to which the concepts, structures, processes, and techniques disclosed herein may be put without deviating from their scope.

Having thus described several aspects of at least one embodiment of the disclosed concepts, structures, processes, and techniques, it is to be appreciated that various alterations, modifications, and improvements will readily occur to those skilled in the art.

Such alterations, modifications, and improvements are intended to be part of this disclosure, and are intended to be within the spirit and scope of the concepts, structures, processes, and techniques described herein. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the concepts, structures, processes, and techniques described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the described concepts, structures, processes, and techniques may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A magnet comprising:

a coil comprising a plurality of windings of a cable, the cable comprising:

a plurality of high temperature superconductor (HTS) components;

a plurality of electrically conductive segments extending along a length of the cable, individual electrically conductive segments of the plurality of electrically conductive segments including at least one of the plurality of HTS components; and an electrically insulating material arranged between adjacent electrically conductive segments of the plurality of electrically conductive segments that electrically insulate the plurality of electrically conductive segments from one another, wherein the insulating material extends from an exterior surface of the adjacent electrically conductive segments to a central longitudinal axis of the cable.

2. The magnet of claim 1, wherein none of the plurality of electrically conductive segments directly contact any of the other electrically conductive segments.

3. The magnet of claim 1, wherein the HTS components comprise HTS tape.

4. The magnet of claim 3, wherein the HTS components comprise a stack of HTS tapes.

5. The magnet of claim 1, wherein the plurality of electrically conductive segments exhibit radial symmetry around the central longitudinal axis of the cable.

6. The magnet of claim 5, wherein the plurality of electrically conductive segments are twisted around the central longitudinal axis of the cable, and wherein the plurality of HTS components follow a helical path around the central longitudinal axis.

7. A magnet comprising:

a coil comprising a plurality of windings of a cable, the cable comprising:

a plurality of high temperature superconductor (HTS) components;

a plurality of electrically conductive segments extending along a length of the cable, individual electrically conductive segments of the plurality of electrically conductive segments including a groove in which at least one of the plurality of HTS components is arranged; and an electrically insulating material arranged between adjacent electrically conductive segments of the plurality of electrically conductive segments that electrically insulates the plurality of electrically conductive segments from one another, wherein the insulating material extends from an exterior surface of the adjacent electrically conductive segments to a central longitudinal axis of the cable.

8. The magnet of claim 7, wherein none of the plurality of electrically conductive segments directly contact any of the other electrically conductive segments.

9. The magnet of claim 7, wherein the HTS components comprise HTS tape.

10. The magnet of claim 9, wherein the HTS components comprise a stack of HTS tapes.

11. The magnet of claim 7, wherein the plurality of electrically conductive segments exhibit radial symmetry around the central longitudinal axis of the cable.

12. The magnet of claim 11, wherein the plurality of electrically conductive segments are twisted around the central longitudinal axis of the cable, and wherein the plurality of HTS components follow a helical path around the central longitudinal axis.

13. A magnet comprising:

a coil comprising a plurality of windings of a cable, the cable comprising:

a plurality of high temperature superconductor (HTS) components;

a plurality of electrically conductive segments extending along a length of the cable, individual electrically conductive segments of the plurality of electrically conductive segments including at least one of the plurality of HTS components;

an interior cooling channel adjacent to each of the plurality of electrically conductive segments; and an electrically insulating material arranged between adjacent electrically conductive segments of the plurality of electrically conductive segments that electrically insulate the plurality of electrically conductive segments from one another, wherein the insulating material extends from an exterior surface of the adjacent electrically conductive segments to the interior cooling channel.

14. The magnet of claim 13, wherein none of the plurality of electrically conductive segments directly contact any of the other electrically conductive segments.

15. The magnet of claim 13, wherein the HTS components comprise HTS tape.

16. The magnet of claim 15, wherein the HTS components comprise a stack of HTS tapes.

17. The magnet of claim 13, wherein the plurality of electrically conductive segments exhibit radial symmetry around a central axis of the cable.

18. The magnet of claim 17, wherein the plurality of electrically conductive segments are twisted around the central axis of the cable, and wherein the plurality of HTS components follow a helical path around the central axis.

* * * * *